United States Patent
Liao et al.

(10) Patent No.: US 8,243,327 B2
(45) Date of Patent: Aug. 14, 2012

(54) METHOD FOR GENERATING BASIC TEMPLATE UTILIZED TO FORM SCREENING MASK

(75) Inventors: Wu-Jie Liao, Changhua County (TW); Meng-Yun Ying, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 572 days.

(21) Appl. No.: 11/770,721

(22) Filed: Jun. 28, 2007

(65) Prior Publication Data

US 2008/0246980 A1 Oct. 9, 2008

(30) Foreign Application Priority Data

Apr. 4, 2007 (TW) .................................. 96111953 A

(51) Int. Cl.
*H04N 1/60* (2006.01)
(52) U.S. Cl. ...... 358/1.9; 358/3.02; 358/3.06; 358/3.12; 358/3.13; 358/3.17; 358/3.2; 358/3.24; 358/3.26; 358/534; 358/536
(58) Field of Classification Search .................. 358/1.9, 358/3.03–3.2, 533–536
See application file for complete search history.

(56) References Cited

U.S. PATENT DOCUMENTS

| | | | | |
|---|---|---|---|---|
| 4,730,221 A | * | 3/1988 | Roetling | 358/3.01 |
| 4,920,501 A | * | 4/1990 | Sullivan et al. | 358/3.19 |
| 5,170,257 A | * | 12/1992 | Burns | 358/3.21 |
| 5,255,085 A | * | 10/1993 | Spence | 358/527 |
| 5,457,541 A | * | 10/1995 | Burns | 358/3.21 |
| 5,469,267 A | * | 11/1995 | Wang | 358/3.21 |
| 5,493,410 A | * | 2/1996 | Oikawa | 358/3.15 |
| 5,608,823 A | * | 3/1997 | Ohtani | 382/271 |
| 5,673,121 A | * | 9/1997 | Wang | 358/3.23 |
| 5,694,224 A | * | 12/1997 | Tai | 358/3.01 |
| 5,696,889 A | * | 12/1997 | Morikawa | 358/1.9 |
| 5,731,884 A | * | 3/1998 | Inoue | 358/3.06 |
| 6,101,002 A | * | 8/2000 | Urasawa | 358/3.13 |
| 6,104,502 A | * | 8/2000 | Shiomi | 358/1.9 |
| 6,118,935 A | * | 9/2000 | Samworth | 358/1.9 |
| 6,501,567 B2 | * | 12/2002 | Sharma et al. | 358/3.19 |
| 6,643,032 B1 | * | 11/2003 | Crean et al. | 358/3.06 |
| 6,654,146 B1 | * | 11/2003 | Inoue | 358/3.07 |
| 6,999,199 B2 | * | 2/2006 | Degani et al. | 358/1.9 |
| 7,102,791 B2 | * | 9/2006 | Hirano et al. | 358/3.13 |
| 2002/0089708 A1 | | 7/2002 | Cheng | |
| 2004/0076328 A1 | | 4/2004 | Li | |
| 2005/0243344 A1 | | 11/2005 | Tai | |

OTHER PUBLICATIONS

Robert Ulichney, "The void-and-cluster method for dither array generation", 1993, Proceedings of SPIE 1913, 332-343.

* cited by examiner

*Primary Examiner* — Richard Zhu
(74) *Attorney, Agent, or Firm* — Winston Hsu; Scott Margo

(57) ABSTRACT

Disclosed is a method for generating a basic template utilized to form a screening mask. The method includes adjusting lines per inch or minimum pattern (such as cluster size or density) of a testing template, printing the adjusted testing template by an outputting device, determining if the gray level of the printing result matches a specific gray level, and continuously adjusting the setting of the lines per inch or the minimum pattern when it does not match the specific gray level, otherwise selecting the adjusted testing template as a basic template. The basic template is optimized according to the printing ability of the outputting device, so the printing performance of the outputting device when using the screening mask formed from the basic template can also be optimized, and the minimum color points can be printed faithfully thereby avoiding dropping of the carbon powder.

10 Claims, 7 Drawing Sheets

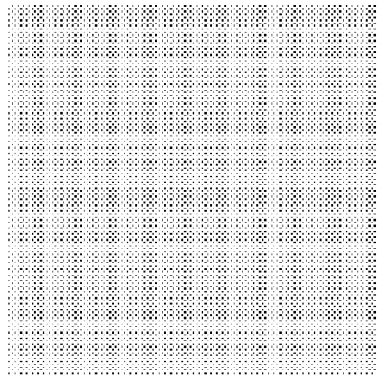
Gray level 25%
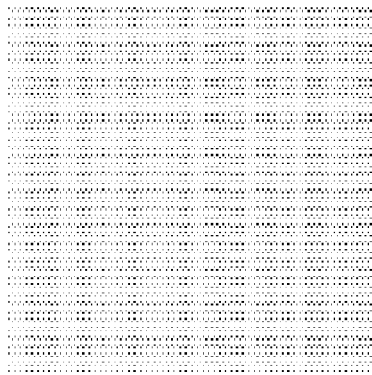
Gray level 16.67%
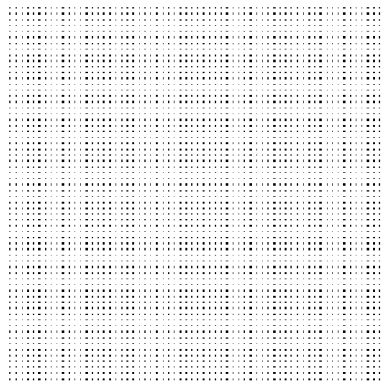
Gray level 12.5%
Fig. 5

METHOD FOR GENERATING BASIC TEMPLATE UTILIZED TO FORM SCREENING MASK

BACKGROUND OF THE INVENTION

1. Field of the Invention

The present invention relates to a method for generating a basic template utilized to form a screening mask, and more particularly, to a method for generating a basic template according to a specific outputting device, such as a laser printer.

2. Description of the Prior Art

To express natural continuous tones through digital techniques in order to make outputs of a digital printer close to the colors of its inputting device, a general technique called halftone represents darker colors in an image by many color points or a larger color point, and represents lighter colors by fewer color points or a smaller color point. The halftone technique utilizes distribution or size of color points to create visual color variations, and its implementations roughly comprise screening, error diffusion and direct binary search, wherein screening is the most popular technique in the printing industry since the complexity of the screening technique is lower than the other techniques.

The screening technique processes an image to be printed by separately comparing and transferring each part of the image to a gray level of a printing device (such as a digital laser printer) through a mask. For example, a digital laser printer can select a pixel from a continuous tone image to be printed by using a mask, compare the tone of the pixel with a plurality of thresholds to transfer the tone to a gray level established inside the printer, and then dispose color points having the same size at different distances according to an algorithm in order to represent the gray level. In this way, the tones of an output halftone image of the printer can be equal to those of the continuous tone image.

The major objective of the mask is therefore to make the color points vary uniformly and to make the output halftone image of the printer represent a continuous tone image faithfully. However, the image performance directly and significantly relates to the efficiency of the printer. For example, when the resolution of the printer is high, the size of the color point utilized by the printer is small, and hence the image that the printer can present is sophisticated. But when the resolution is not high or the absorbability of carbon powders is not good, small color points cannot be output normally, and the final printing quality will be influenced due to dropping of the carbon powders. This shows that a mask suitable for one specific printer may not be suitable for another printer. However, the mask generally utilized in the printer is designed by the manufacturer, and is not optimized according to each printer, therefore the printing quality cannot be guaranteed.

SUMMARY OF THE INVENTION

One objective of the present invention is to provide a method for generating a basic template utilized to form a screening mask. The method optimizes the screening mask according to each outputting device to ensure that the minimum color point can be printed faithfully thereby avoiding the influence of dropping carbon powders on the output result.

According to an exemplary embodiment of the present invention, a method for generating a basic template is disclosed. The method comprises: (a) adjusting lines per inch of a testing template; (b) printing the adjusted testing template by an outputting device to generate a first printing result; (c) determining if the gray level of the first printing result matches a first specific gray level; (d) when it does not match the first specific gray level, adjusting the setting of step (a) according to the first printing result and repeating step (b) and (c); and (e) when it matches the first specific gray level, choosing the adjusted testing template as a first basic template.

According to another exemplary embodiment of the present invention, a method for generating a basic template is disclosed. The method comprises: (a) adjusting a minimum pattern of a testing template; (b) printing the adjusted testing template by an outputting device to generate a printing result; (c) determining if the gray level of the printing result matches a specific gray level; (d) when it does not match the specific gray level, adjusting the setting of step (a) according to the first printing result and repeating step (b) and (c); and (e) when it matches the specific gray level, selecting the adjusted testing template as a first basic template.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram of different minimum distributing densities based on a 150 lpi first basic template.

DETAILED DESCRIPTION

The present invention designs basic templates utilized to form a screening mask according to an outputting device. Since the basic templates are adjusted based on the printing ability and efficiency of the outputting device, the screening mask formed by those basic templates can optimize the output performance of the outputting device, ensuring that minimum color points can be output faithfully and avoiding the influence of dropping of carbon powders on the output result of the outputting device.

Figure 1:
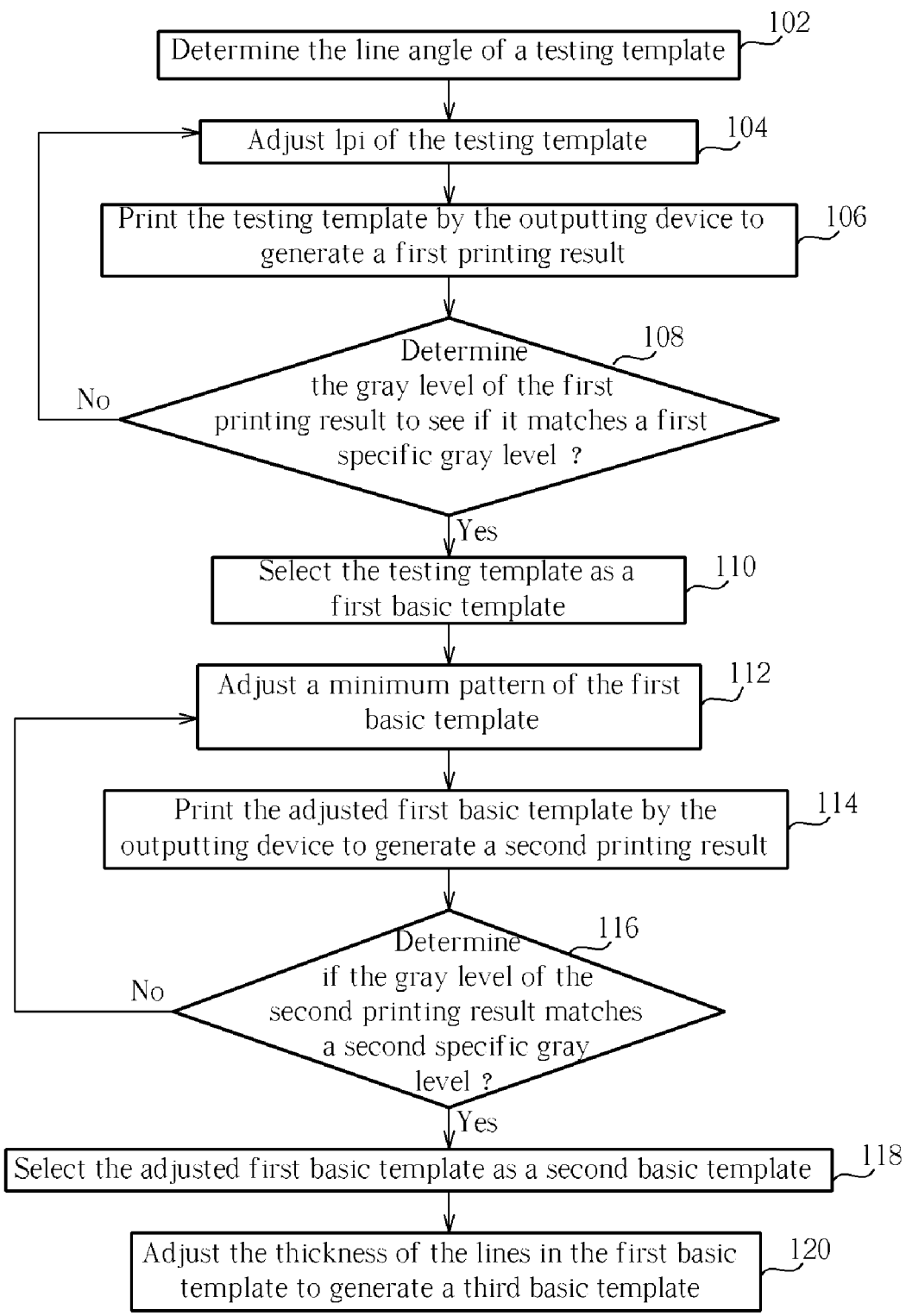
FIG. 1 is a flow chart showing the process of generating basic templates according to an exemplary embodiment of the present invention.
Figure 2:
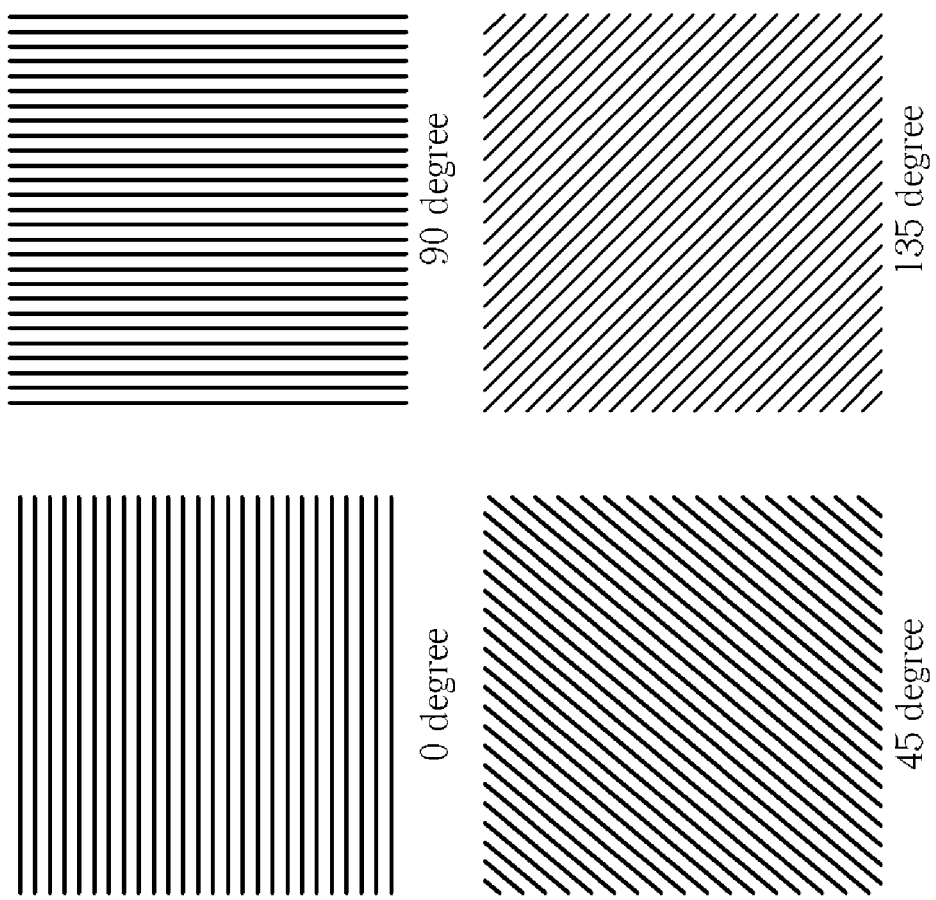
FIG. 2 is a diagram of testing templates having different line angles.
Figure 3:
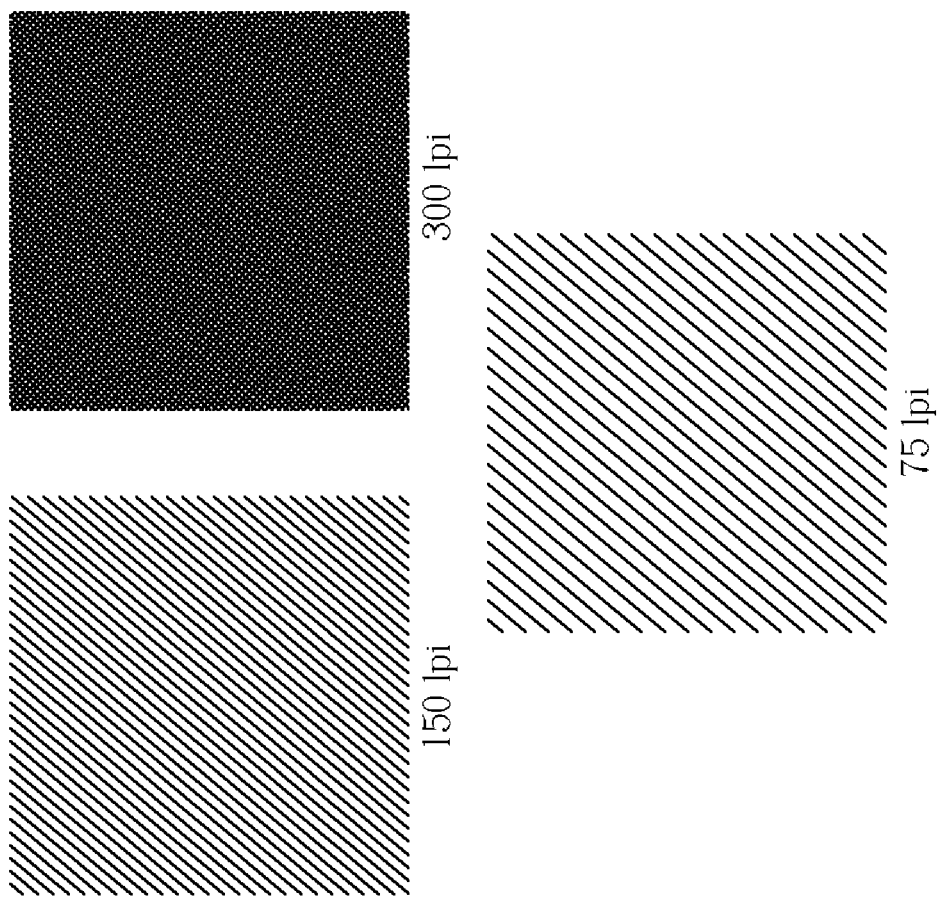
FIG. 3 is a diagram of testing templates having different lines per inch.

Please refer to FIG. 1, which is a flow chart showing the process of generating basic templates suitable to an outputting device (such as a laser printer) according to an exemplary embodiment of the present invention. As shown in FIG. 1, when generating N*N basic templates, the line angle of a testing template is first determined (step 102). The line angle includes 0, 45, 90, 135 degrees, etc. (as shown in FIG. 2). Setting each color (blue, red, yellow and black) generally used when printing a different line angle can solve color shift when superimposing colors or reduce the visual affect of stripes, therefore in step 102, the line angle of blue, red, yellow and black color is usually set to be different. The following description takes 45 degree as an example of the line angle. Step 104 adjusts lines per inch (lpi) of the testing template. As shown in FIG. 3, the more lpi there are, the higher the gray level of the basic template. Therefore, in order to select a suitable lpi of the basic template, step 106 prints the testing template by the outputting device to generate a first printing result, and the gray level of the first printing result is then determined to see if it matches a first specific gray level (step 108). When it does not match the first specific gray level, the process returns to step 104 to further adjust the lpi of the testing template according to the first printing result, and repeats step 106 and 108 until the first printing result matches the first specific gray level, and in this situation, the process enters step 110, selecting the adjusted testing template as a first basic template $\Lambda$. The determination of step 108 can be performed by machines or the human eye. In order to facilitate the determination, the first specific gray level can be chosen to be a gray level of 50% gray.

Figure 4:
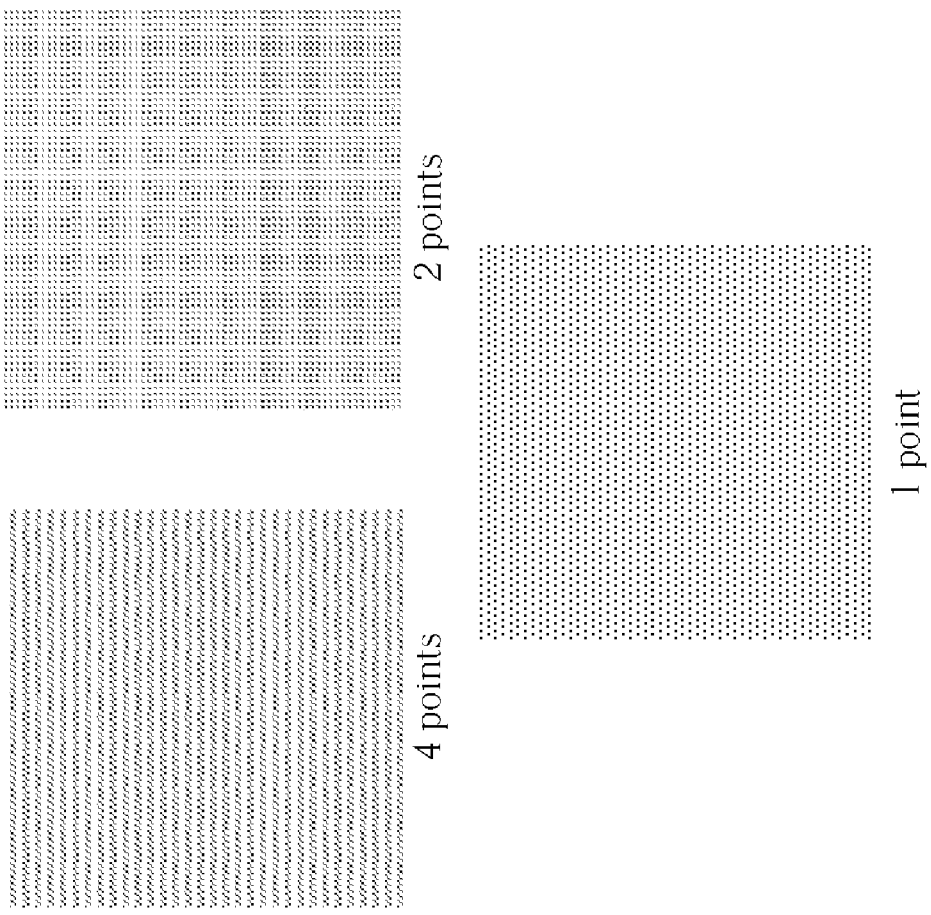
FIG. 4 is a diagram of different minimum cluster sizes based on a 150 lpi first basic template.

Next, step 112 adjusts a minimum pattern (for example, a minimum cluster size or minimum distributing density) of the first basic template $\Lambda$ selected in the previous step. FIG. 4 is a diagram showing different minimum cluster sizes based on the first basic template $\Lambda$ with 150 lpi, and FIG. 5 is a diagram showing different minimum distributing densities based on the first basic template $\Lambda$ with 150 lpi. As can be seen, the points are grown along a line in this embodiment. To ensure the faithful output of the minimum color points, step 114 prints the adjusted first basic template $\Lambda$ by the outputting device to generate a second printing result, and step 116 determines if the gray level of the second printing result matches a second specific gray level. The second gray level corresponds to the minimum distributing density. In this embodiment, the second specific gray level is the first specific gray level multiplied by a specific ratio. For example, the second specific gray level is a gray level of 25% gray, however, the present invention is not limited to this example. If the determination result is that the second printing result does not match the second specific gray level, the process returns to step 112 for further adjusting the setting of the minimum pattern according to the second printing result, and repeats step 114 and 116 until the second printing result matches the second specific gray level. If the determination result is yes, the process enters step 118, selecting the adjusted first basic template $\Lambda$ as a second basic template $\Omega$.

Figure 7:
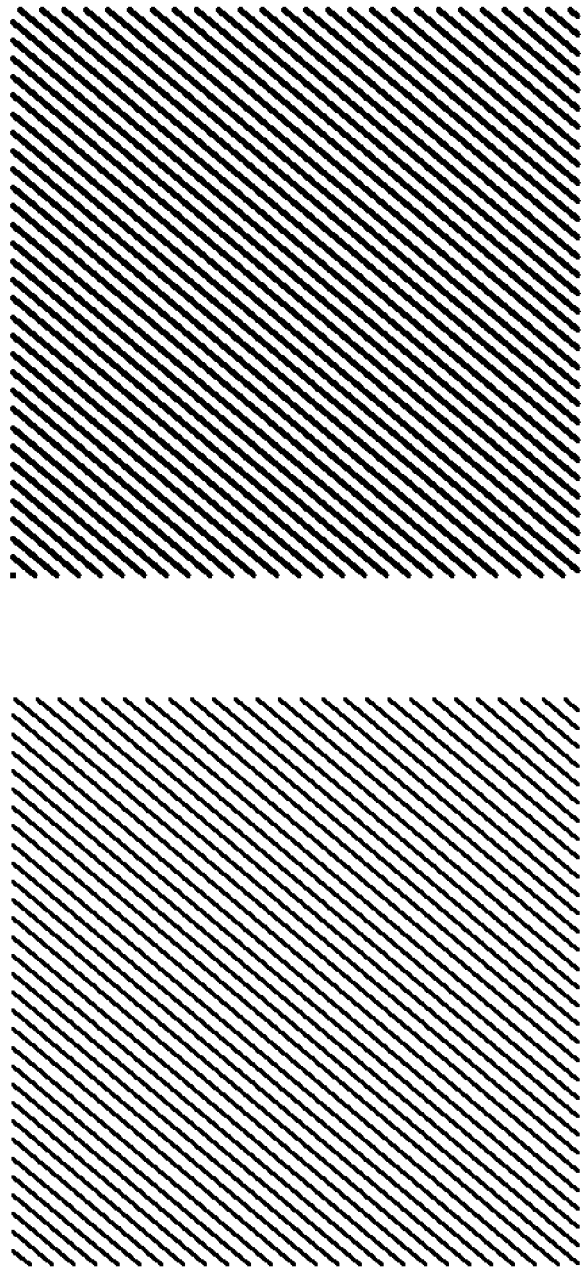
FIG. 7 is a diagram of a third basic template generated by growing each point in a first basic template one point to the right.

Then, the thickness of the lines in the first basic template $\Lambda$ is adjusted to generate a third basic template $\Phi$ (step 120). For example, as shown in FIG. 7, the third basic template $\Phi$ is formed by growing each point in the first basic template $\Lambda$ one point to the right, and in this situation, the mask formed by this basic template will represent a halftone image by different thickness of the lines. Three basic templates are generated in this embodiment, but it should be noted that this is the minimum number of basic templates necessary to form a mask when the lpi is 150. Therefore, when the lpi is selected to be another number, the minimum number of basic templates necessary is different. However, there is no upper bound of the basic templates. When the number of basic templates increases, the variation of the screening mask formed by the basic templates increases accordingly, but the production cost rises as well. Moreover, provided that substantially the same result is achieved, the steps shown in FIG. 1 need not be in the exact order shown and need not be contiguous, that is, other steps can be intermediate.

The preferred embodiment disclosed above forms a best basic template by adjusting lpi and the minimum pattern respectively. However, the present invention is not limited to this embodiment. That is, in other embodiments, the basic template can be formed by adjusting either the lpi or the minimum pattern. For example, by utilizing the adjusting mechanism and process of the lpi or the minimum pattern disclosed in FIG. 1 and the above description, the objective of properly adjusting the basic templates according to the printing ability and efficiency of the outputting device can also be achieved. Compared to the prior arts, these variations can improve the performance of the outputting device, and therefore all conform to the spirit of the present invention.

Figure 6:
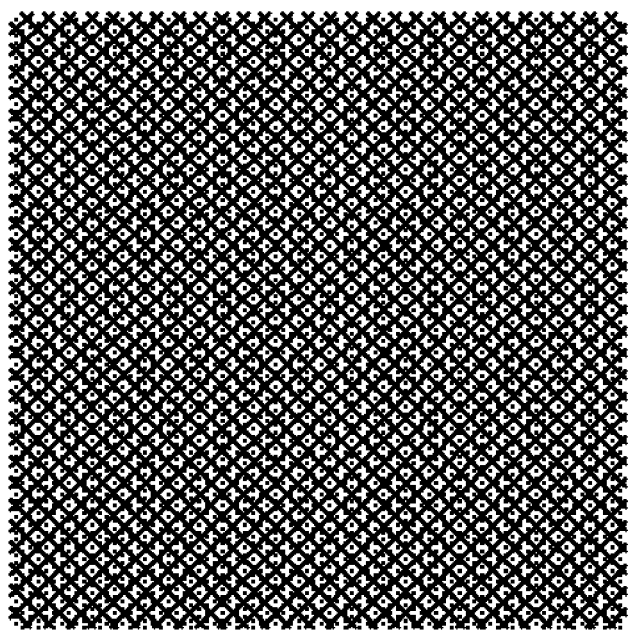
FIG. 6 is a diagram of an X-mask.

Since step 116 has determined the second printing result of the outputting device and settings of the minimum pattern exceeding the printing ability of the outputting device are excluded, it can be ensured that the carbon powders will not drop when printing. Furthermore, the minimum cluster shape of the first basic template can be adjusted in step 112 to increase the variation of the mask. For example, FIG. 6 is a diagram showing an X-mask resulting from replacing dots with X's. Moreover, since the present invention can identify the exact minimum pattern causing no dropping of powders, compensation can be added to the mask to make the output color points thicker, thereby keeping the color levels at high illumination as real as possible.

After generating the basic templates, the screening mask can be formed by utilizing the above first, second and third basic templates and a known algorithm such as Void and Cluster algorithm. Since the feature of the present invention is the design of the basic templates, and the process of forming the screening mask by the Void and Cluster algorithm is well known to those skilled in the art, the related steps of the process should be readily appreciated, therefore further description is omitted here for the sake of brevity.

Those skilled in the art will readily observe that numerous modifications and alterations of the device and method may be made while retaining the teachings of the invention.

What is claimed is:

1. A method for forming a basic template, comprising:
   (a) adjusting lines per inch of a testing template;
   (b) printing the testing template utilizing an outputting device to generate a first printing result;
   (c) determining if a gray level of the first printing result matches a first specific gray level;
   (d) when the gray level of the first printing result does not match the first specific gray level, adjusting a setting of lines per inch in step (a) according to the first printing result and repeating steps (b) and (c);
   (e) when the gray level of the first printing result matches the first specific gray level, selecting the testing template as a first basic template;
   (f) adjusting a minimum pattern of the first basic template to generate an adjusted first basic template;
   (g) printing the adjusted first basic template utilizing the outputting device to generate a second printing result;
   (h) determining the minimum pattern not exceeding printing ability of the outputting device to ensure that no carbon powder drops when the outputting device prints by determining if a gray level of the second printing result matches a second specific gray level;
   (i) when the gray level of the second printing result does not match the second specific gray level, adjusting a setting of the minimum pattern in step (f) according to the second printing result and repeating steps (g) and (h);
   (j) when the gray level of the second printing result matches the second specific gray level, selecting the adjusted first basic template as a second basic template; and
   (k) adding compensation to the second basic template to make output color points thicker.

2. The method of claim 1, wherein step (a) further comprises:
 determining a line angle of the testing template.

3. The method of claim 1, wherein step (f) further comprises:
 adjusting a minimum cluster size, shape or density of the first basic template to generate the adjusted first basic template.

4. The method of claim 3, wherein the second specific gray level is determined according to the minimum cluster density.

5. The method of claim 1, wherein the second specific gray level is the first specific gray level multiplied by a specific ratio.

6. The method of claim 5, wherein the specific ratio is substantially equal to ½.

7. The method of claim 1, wherein the second specific gray level is a gray level of 25% gray.

8. The method of claim 1, wherein the first specific gray level is a gray level of 50% gray.

9. The method of claim 1, further comprising:
 adjusting a line thickness of the first basic template to generate a third basic template.

10. The method of claim 1, wherein the outputting device is a laser printer.

* * * * *